United States Patent
Dunbar (10) Patent No.: US 10,694,266 B2
(45) Date of Patent: *Jun. 23, 2020

(54) LOAD MONITORING SYSTEM FOR WASTE RECEPTACLE

(71) Applicant: Rubicon Global Holdings, LLC, Atlanta, GA (US)

(72) Inventor: Hunter Dane Dunbar, Atlanta, GA (US)

(73) Assignee: Rubicon Global Holdings, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,328

(22) Filed: Sep. 3, 2019

(65) Prior Publication Data

US 2019/0394543 A1    Dec. 26, 2019

Related U.S. Application Data

(63) Continuation of application No. 16/030,511, filed on Jul. 9, 2018, now Pat. No. 10,405,071, which is a continuation of application No. 15/678,861, filed on Aug. 16, 2017, now Pat. No. 10,021,467.

(51) Int. Cl.
   *G08B 21/00* (2006.01)
   *H04Q 9/00* (2006.01)
   *G08G 1/00* (2006.01)
   *B65F 3/00* (2006.01)
   *B65F 3/02* (2006.01)

(52) U.S. Cl.
   CPC .............. *H04Q 9/00* (2013.01); *B65F 3/00* (2013.01); *B65F 3/02* (2013.01); *G08G 1/20* (2013.01); *B65F 2003/022* (2013.01); *G08C 2201/93* (2013.01); *H04Q 2209/40* (2013.01); *H04Q 2209/823* (2013.01)

(58) Field of Classification Search
   CPC ........ G08B 21/182; G08B 5/36; G01G 15/00; B66F 17/00
   USPC .......................................................... 340/666
   See application file for complete search history.

(56) References Cited

U.S. PATENT DOCUMENTS

| | | | |
|---|---|---|---|
| 4,372,265 A | 2/1983 | Kasiewicz | |
| 4,771,837 A * | 9/1988 | Appleton | B65F 3/04 177/139 |
| 5,837,945 A * | 11/1998 | Cornwell | B65F 3/04 177/136 |
| 5,994,650 A * | 11/1999 | Eriksson | B66F 9/122 177/141 |
| 8,764,371 B2 * | 7/2014 | Whitfield, Jr. | B65F 3/00 414/406 |
| 9,534,948 B2 | 1/2017 | Lustenberger | |

(Continued)

*Primary Examiner* — Mark S Rushing
(74) *Attorney, Agent, or Firm* — Rock IP, PLLC (57) ABSTRACT

A system is disclosed for monitoring waste collected by a service vehicle. The system may include a lift actuator configured to cause lifting of the waste, a power takeoff driven by a powertrain of the service vehicle to power the lift actuator, and a sensor configured to generate a speed signal indicative of a speed of the powertrain. The system may also include an output device, and a controller in communication with the sensor and the output device. The controller may be configured to receive the speed signal from the sensor, determine an amount of waste lifted by the lift actuator based on the speed signal, and relay the amount of waste to the output device.

20 Claims, 3 Drawing Sheets

(56) References Cited

U.S. PATENT DOCUMENTS

2010/0206642 A1* 8/2010 Curotto ............... G06Q 10/30
 177/1
2015/0284226 A1 10/2015 Hall et al.

* cited by examiner

LOAD MONITORING SYSTEM FOR WASTE RECEPTACLE

RELATED APPLICATIONS

This application is a continuation of U.S. application Ser. No. 15/678,861 filed on Aug. 16, 2017, which is hereby incorporated by reference in its entirety.

TECHNICAL FIELD

The present disclosure relates generally to a monitoring system and, more particularly, to a system for monitoring loading of a waste receptacle.

BACKGROUND

Service vehicles have been used in the waste industry to collect waste from a receptacle (e.g., from a dumpster or a wheeled tote) and to transport the waste to a final disposition location. A conventional service vehicle includes forks or arms that extend forward, rearward, and/or to the side of a bed. The forks engage corresponding features (e.g., pockets or slots) formed in each receptacle, such that the receptacle can be lifted and dumped into the bed. In some embodiments, a hydraulic circuit is operatively connected to the forks, such that the forks and receptacle can be moved with reduced effort.

It can be important to gather information about the receptacle and/or the waste collected from the receptacle during servicing. For example, some service providers bill their customers based on an amount of waste (e.g., a weight of the waste) collected from each customer's receptacle. In another example, compliance with particular regulations (e.g., roadway regulations, emissions regulations, recycling regulations, hazardous waste regulations, etc.) requires that information be collected in association with waste discarded by particular customers and/or transported to particular final disposition locations. In these examples (and in other examples), the information may be collected by way of one or more sensors mounted to the service vehicle. For example, a strain gauge could be mounted in the bed of the service vehicle or to a strut supporting the bed and used to measure a change in payload of the service vehicle during service at a particular customer location. In another example, a pressure sensor could be associated with the hydraulic circuit connected to the forks of the vehicle and used to measure a change in hydraulic pressure associated with an engaged receptacle.

Although the sensors used in conventional waste service vehicles may be appropriate for some applications, they can also be expensive, slow to respond, inaccurate, and/or mounted in exposed areas that make them prone to damage. The disclosed system is directed to overcoming one or more of the problems set forth above and/or other problems of the prior art.

SUMMARY

In one aspect, the present disclosure is directed to a system for monitoring waste collected by a service vehicle. The system may include a lift actuator configured to cause lifting of the waste, a power takeoff driven by a powertrain of the service vehicle to power the lift actuator, and a sensor configured to generate a speed signal indicative of a speed of the powertrain. The system may also include an output device, and a controller in communication with the sensor and the output device. The controller may be configured to receive the speed signal from the sensor, determine an amount of waste lifted by the lift actuator based on the speed signal, and relay the amount of waste to the output device.

In another aspect, the present disclosure is directed to another system for monitoring waste collected by a service vehicle. This system may include a locating device configured to generate a location signal indicative of a location of the service vehicle, a lift actuator configured to cause lifting of the waste, and a power takeoff driven by a powertrain of the service vehicle to power the lift actuator. The system may also include a sensor configured to generate a speed signal indicative of a rotational speed of the powertrain, a display, and a controller in communication with the location device, the sensor, and the display. The controller may be configured to receive the location signal from the locating device, receive the speed signal from the sensor, and determine an amount of waste lifted by the lift actuator as a function of the rotational speed of the powertrain only when the location signal indicates that the service vehicle is at a known service stop. The controller may be further configured to cause the amount of waste to be shown on the display, along with at least one of an identification and coordinates of the known service stop.

In yet another aspect, the present disclosure is directed to a method of monitoring waste collected by a service vehicle. The method may include diverting power from a powertrain of the service vehicle to a lift actuator to cause lifting of the waste, and generating a speed signal indicative of a speed of the powertrain. The method may also include determining an amount of waste lifted by the lift actuator based on the speed signal, and relaying the amount of waste to an output device.

DETAILED DESCRIPTION

Figure 1:
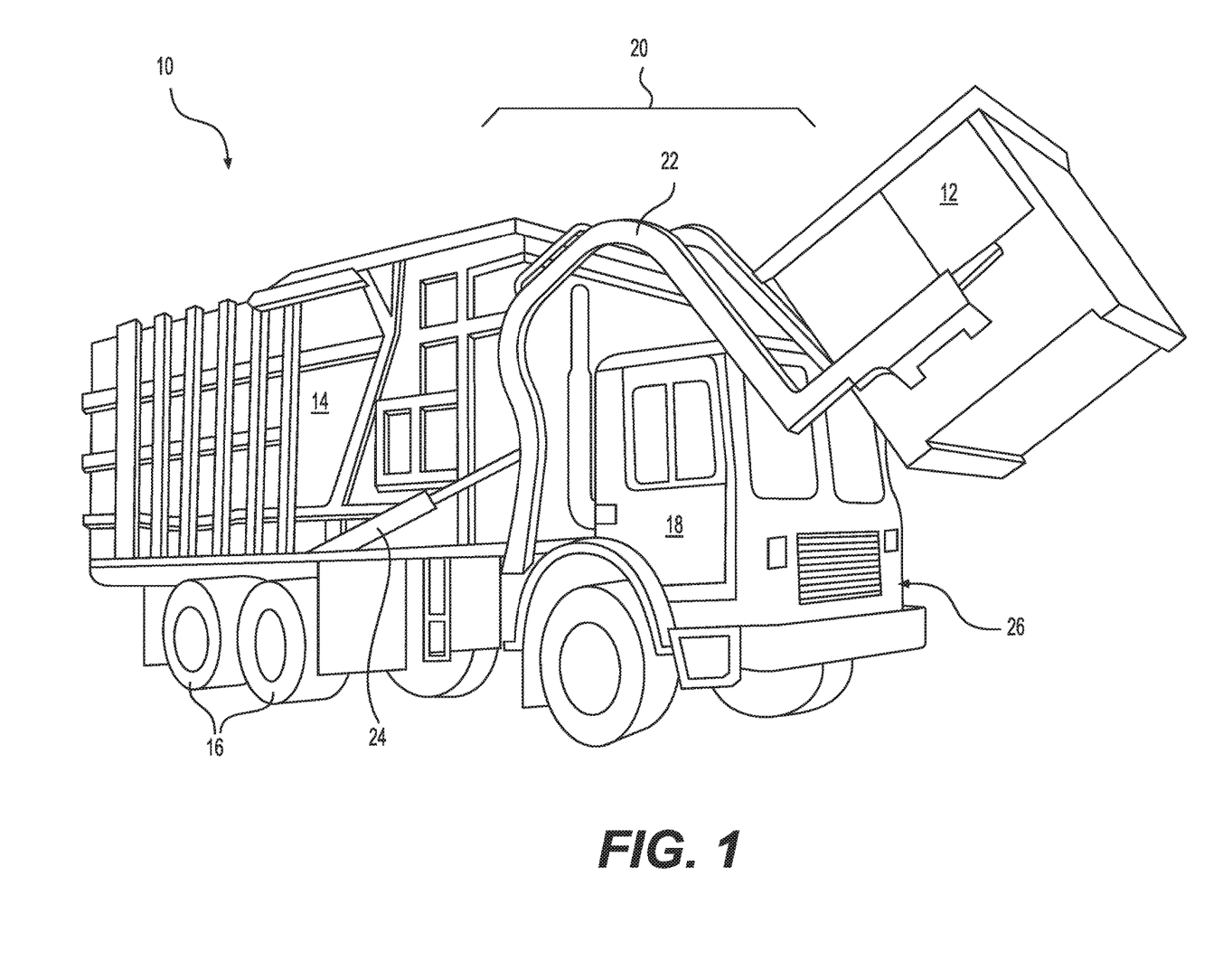
FIG. 1 is an isometric illustration of an exemplary disclosed waste service vehicle.

FIG. 1 illustrates an exemplary waste service vehicle 10 that is configured to service a receptacle 12. The service may include, for example, the removal of waste materials from inside of receptacle 12, the removal of receptacle 12, and/or the placement of new or additional receptacles 12 at a particular customer location.

Service vehicle 10 may take many different forms. In the example shown in FIG. 1, service vehicle 10 is a hydraulically actuated, front-loading type of service vehicle. Specifically, service vehicle 10 may include a bed 14 supported by a plurality of wheels 16, a cab 18 located forward of bed 14, and a lifting device 20 extending forward of cab 18. Lifting device 20 may consist of, among other things, one or more lift arms 22 that are configured to engage and/or grasp receptacle 12, and one or more actuators 24 connected to lift arms 22. Actuators 24 may be powered (e.g., by pressurized oil) to raise lift arms 22 and receptacle 12 up past cab 18 to a dump location over bed 14. After dumping of receptacle 12, actuator(s) 24 may allow lift arms 22 and receptacle 12 to lower back to the ground in front of service vehicle 10.

In another example (not shown), service vehicle 10 may be a flatbed or roll-off type of service vehicle. Specifically, lifting device 20 may extend rearward of cab 18 and be powered to raise receptacle 12 up onto bed 14 for transportation of receptacle 12 away from the environment. After dumping of receptacle 12 at a landfill (or swapping of a full receptacle 12 for an empty receptacle 12), receptacle 12 may be returned to the service location and lowered back to the ground behind service vehicle 10. In other examples (not shown), lifting device 20 may be located to pick up receptacles 12 from a side or rear of service vehicle 10. Other configurations may also be possible.

Figure 2:
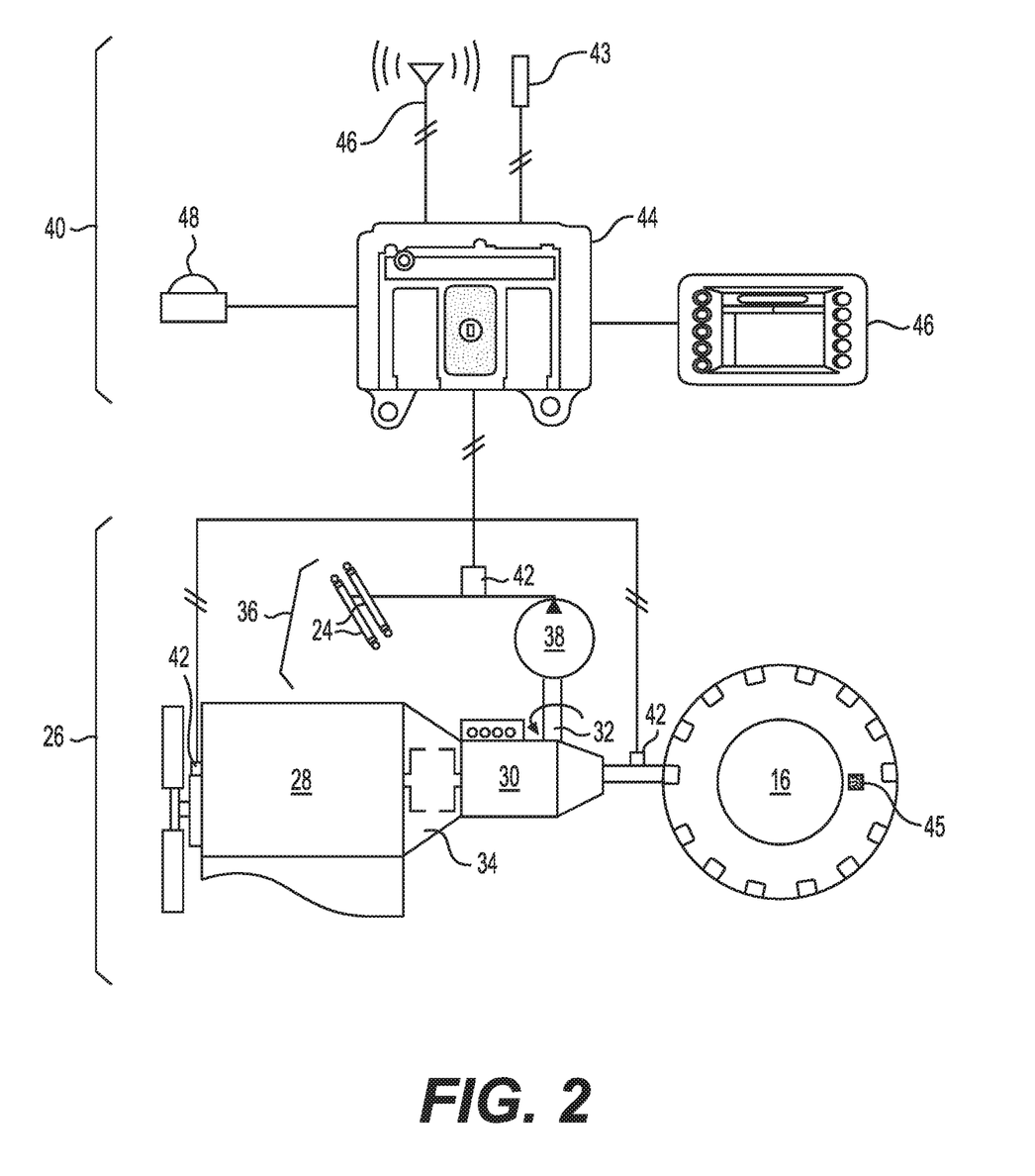
FIG. 2 is a diagrammatic illustration of an exemplary disclosed load monitoring system for use with the waste service vehicle of FIG. 1.

Service vehicle 10 may include a powertrain 26 that provides power to rotate wheels 16 and to cause actuators 24 to extend and lift receptacle 12. As shown in FIG. 2, powertrain 26 may include, among other things, an engine 28, a transmission 30, and a power takeoff (PTO) 32. Engine 28 may embody any type of engine known in the art, for example, a diesel engine, a gasoline engine, or a gaseous-fuel powered engine configured to generate a mechanical power output. Transmission 30 may be connected to the mechanical power output of engine 28 (e.g., via a torque converter 34), and itself include an output that can be connected to one or more of wheels 16. Transmission 30 may embody a mechanical speed-shift transmission, a hydraulic transmission, an electric transmission, or a hybrid transmission having any combination of mechanical, hydraulic, and/or electric components. PTO 32 may be attached to receive power from engine 28 directly, or indirectly via transmission 30 and/or torque converter 34, and to divert the power to an auxiliary circuit (e.g., to a hydraulic circuit 36). In the disclosed embodiment, PTO 32 is a mechanical gearbox. It is contemplated, however, that PTO 32 could embody or otherwise include electrical and/or hydraulic components, if desired.

Hydraulic circuit 36 may include a pump 38 that receives a rotational input from PTO 32 and generates a corresponding flow of pressurized oil that is selectively directed through actuators 24, causing actuators 24 to extend and raise lift arms 22 (referring to FIG. 1). For example, pump 38 may be driven by PTO 32 to draw in low-pressure fluid (e.g., from a sump—not shown), pressurize the fluid, and direct the fluid through one or more valves (not shown) into first or head-end chambers of actuators 24. At the same time, low-pressure fluid from opposing second or rod-end chambers of actuators 24 may be drained from actuators 24 back to the sump. The introduction of high-pressure fluid into the head-end chambers and the simultaneous draining of low-pressure fluid from the rod-end chambers may create a pressure imbalance inside actuators 24 that causes associated pistons of actuators 24 to extend and raise lift arms 22. To lower lift arms 22, the fluid inside of the head-end chamber may be drained back to the sump, allowing a weight acting on actuators 24 (e.g., the weight of lift arms 22 and receptacle 12) to cause retraction of actuators 24 back to their original positions.

A speed of actuators 24 in raising lift arms 22 (and any connected receptacle 12) may be at least partially dependent on a flow rate of the oil entering the head-end chambers of actuators 24; the flow rate of the oil may be at least partially dependent on an input power of pump 38 (i.e., an output power of PTO 32) and a combined weight of lift arms 22, receptacle 12, and the waste contained within receptacle 12. For example, for a given input power of PTO 32, a greater weight pressing down on actuators 24 may result in pump 38 converting a greater portion of the input power from PTO 32 into pressure rather than flow rate, making for slower raising of lift arms 22. In contrast, for the same input power of PTO 32, a lower weight pressing down on actuators 24 may result in pump 38 converting a greater portion of the input power from PTO 32 into flow rate rather than pressure, making for faster raising of lift arms 22. Accordingly, the raising-speed of lift arms 22 and/or a time required to raise lift arms 22 to the dump position may be related (e.g., proportional) to loading of actuators 24 (and, due to connections through lift arms 22 and receptacle 12, to an amount of waste contained within receptacles 12).

Similarly, an output speed of PTO 32 may be related to loading of actuators 24. For example, when actuators 24 are heavily loaded, pump 38 may draw more torque from PTO 32 to create the higher-pressures described above. And in contrast, when actuators 24 are lightly loaded, pump 38 may draw less torque from PTO 32. For a given amount of power output from PTO 32, a greater torque-draw may result in slower output speeds and longer required operation (e.g., to fully raise receptacle 12 to the dump position), while a lower torque-draw may result in faster output speeds and shorter required operation. Accordingly, loading of actuators 24 may be determined, at least in part, based on rotational speeds of PTO 32 and/or a time duration of PTO operation.

As PTO 32 provides power to hydraulic circuit 36 via pump 38, PTO 32 may draw an even greater amount of power from engine 28 (e.g., via transmission 30 and/or torque converter 34). For example, as PTO 32 is engaged to power pump 38, an even higher load (e.g., a load associated with the power passed to hydraulic circuit 36, plus a load associated with efficiency losses) may be temporarily placed on engine 28. In some applications, engine 28 may be controlled (provided with increased fueling) to operate at a higher speed in order to provide for this temporary increased loading condition. In other applications, engine 28 may simply be allowed to lug down to a lower speed (i.e., to divert power from engine speed to torque output) during the temporary loading condition. In either situation, loading of actuators 24 may be determined, at least in part, based on rotational speeds of engine 28 (and/or speeds of other rotating components, such as axles, shafts, bearings, gears, etc., that are located between engine 28 and PTO 32) and/or the time during which engine 28 operates at the higher or lower speeds (i.e., speeds that deviate from a normal unloaded idle speed). For example, the output shaft speed of a given model of PTO is dependent upon multiple factors including truck engine speed, transmission gearing, pitch line velocity, and the internal gear ratio of the PTO.

As shown in FIG. 2, service vehicle 10 may be provided with a load monitoring system ("system") 40 that can be used to track loading of actuators 24 (and a corresponding weight of waste contained within receptacle 12 that is raised by actuators 24 via lift arms 22) based at least partially on a rotational speed of powertrain 26 (e.g., a speed of pump 38, a speed of PTO 32, a speed of engine 28, a speed of transmission 30, a speed of torque converter 34, and/or a speed of any intermediate rotating components). System 40 may include, among other things, at least one sensor 42 configured generate a signal indicative of the rotational speed described above, a controller 44 in communication with sensor 42 and configured to determine the loading of actuators 24 based on the signal, and an output device 46 used by controller 44 to relay information regarding the loading.

In one embodiment, sensor 42 is a conventional rotational speed detector having a stationary element rigidly connected to the frame of service vehicle 10 that is configured to sense a relative rotational movement of powertrain 26 (e.g., a rotation of pump 38, a rotation of PTO 32, a rotation of transmission 30, a rotation of torque converter 34, a rotation of engine 28, and/or a rotation of any intermediate component connecting these devices to each other). In the depicted example, the stationary element is a magnetic or optical element that detects the rotation of an indexing element (e.g., a toothed tone wheel, an embedded magnet, a calibration stripe, teeth of a timing gear, a cam lobe, etc.) connected to rotate with powertrain 26. The stationary element of sensor 42 may be located adjacent to the indexing element and configured to generate a signal each time the indexing element (or a portion thereof, e.g., a tooth) passes near the stationary element. This signal may be directed to controller 44, and controller 44 may use this signal (e.g., a frequency of signal receipt) to determine the rotational speed of powertrain 26 relative to the stationary element of sensor 42.

In another embodiment, sensor 42 is an acoustic and/or vibrational type sensor (e.g., a microphone or accelerometer) configured to remotely detect the rotational speed of powertrain 26 (e.g., without direct access to any rotating components) and generate corresponding signals. For example, sensor 42 may be able to receive sound waves transmitted through the air and/or through a framework of service vehicle 10 that are generated by engine 28, transmission 30, PTO 32, and/or pump 38, and convert the sound waves to electrical impulses directed to controller 44. In this embodiment, any one or more of sensor 42, controller 44, and display 46 could be integrally formed and/or packaged together in a handheld device (e.g., a smartphone or tablet carried by the operator), as desired.

Sensor 43 may be any type of sensing and/or transducing device configured to monitor a parameter associated with the waste material being loaded into service vehicle 12 and/or the associated receptacles 12 being moved by service vehicle 10 (e.g., moved by lift arms 24), and to generate corresponding signals indicative thereof. Each of these sensors 43 may be located anywhere on or in service vehicle 12. In one example, sensor 43 may embody a lift sensor, such as any one or more of a load cell, a force gauge, a pressure sensor, a motion sensor, or another type of lift sensor associated directly with lift arms 22, with actuator(s) 24, and/or with receptacle 12. In this example, the signals generated by sensor 43 may correspond with strain on lift arms 22, with a force applied to lift arms 22 by actuator(s) 24, with a motion of receptacle 12, etc.

Alternatively, sensor 43 could be an acoustic sensor (e.g., one or more microphones), an accelerometer, or another similar type of sensor configured to detect engagement conditions and/or cycle completion of lift arms 22, an in-bed compactor, a receptacle door, etc. during lifting, dumping, and/or shaking of receptacle 12. Signals generated by these sensors 43 may be communicated to controller 44. In this embodiment, any one or more of sensor 42, 43, controller 44, and display 46 could be integrally formed and/or packaged together in a handheld device (e.g., a smartphone or tablet carried by the operator), as desired. It is contemplated that sensor 42 may perform some or all of the functions described regarding sensor 43.

Sensor 45 may include a tire pressure monitoring system located within a wheel 16 and configured to generate real-time, or near real-time signals associated with the air pressure and/or temperature of wheel 16. Sensor 45 may be equipped with logic and a wireless transceiver, and be configured to transmit data to and/or receive instructions from controller 44.

Controller 44 may include means for monitoring, recording, storing, indexing, processing, interpreting, and/or communicating information based on the signals generated by sensor(s) 42, 43, and/or 45. These means may include, for example, a memory, one or more data storage devices, a central processing unit, or any other component that may be used to run the disclosed application. Furthermore, although aspects of the present disclosure may be described generally as being stored in memory, one skilled in the art will appreciate that these aspects can be stored on, or read from, different types of computer program products or computer-readable media such as computer chips and secondary storage devices, including hard disks, floppy disks, optical media, CD-ROM, or other forms of RAM or ROM.

Controller 44 may be configured to determine loading of actuators 24 (e.g., a weight of the waste inside of receptacle 12 during raising by lift arms 22) based at least in part on the signal generated by sensor(s) 42. Controller 44 may then cause a representation of the weight to be relayed to a local or remote user via output device 46.

In some embodiments, controller 44 may need to first filter and/or buffer the signal from sensor(s) 42 prior to relaying the information described above. For example, controller 44 may be configured to utilize the signal generated by sensor(s) 42 only when the signal has a value above a predefined threshold and/or within an expected range. For example, only when the signal indicates that at least a known weight of receptacle 12 (or at least a minimum amount greater than the known receptacle weight, for example at least 25 lbs. greater) has been loaded onto actuators 24, will controller 44 record the information, relay the information to a remote system, and/or cause corresponding information to be displayed. This may help to avoid errors in tracking the weight of collected materials.

Output device 46 may embody any type of device known in the art for relaying weight-related information received from controller 44 to a user (e.g., to an operator of service vehicle 10). In one embodiment, output device 46 is a visual display (e.g., a liquid crystal display (LCD), a cathode ray tube (CRT), a personal digital assistant (PDA), a plasma display, a touch-screen, a portable hand-held device, or any such display device known in the art) configured to actively and responsively show the weight-related information described above to the operator of service vehicle 10. The display may be connected to controller 44, and controller 44 may execute instructions to render graphics and images on the display that are associated with loading of actuators 24. In another embodiment, output device 46 is a communication device configured to relay the information to a remote location (e.g., to a back office). As a communication device, output device 46 may include hardware and/or software that enable the sending and/or receiving of data messages through a communications link. The communications link may include satellite, cellular, infrared, radio, and any other type of wireless communications.

It is contemplated that output device 46, in addition to relaying weight-related information, could also be used to provide a way for an operator of service vehicle 10 to input observances made while traveling around the environment. For example, the operator may be able to enter a type and/or condition of waste observed at a particular location, an amount of waste in or around receptacle 12, a fill status of a particular receptacle 12, a condition of receptacle 12, a location of receptacle 12, a type of waste material being transported, an end-disposition location of the waste material, and/or other information about receptacle 12 and the waste engaged by, loaded into, or otherwise processed by service vehicle 10. The information may be input in any number of ways, for example via a touch screen interface, via one or more buttons, via a keyboard, via speech recognition, via a camera, or in another manner known in the art.

In some instances, the weight information generated by controller 44 may be linked (e.g., by controller 44 and/or an operator of service vehicle 10) to a particular service location. The service location may be determined and manually input by the operator of service vehicle 10, or automatically determined and received by controller 44 (e.g., based on a location detected by a locating device 48).

Locating device 48 may be configured to generate signals indicative of a geographical position and/or orientation of service vehicle 10 relative to a local reference point, a coordinate system associated with a local waste environment, a coordinate system associated with Earth, or any other type of 2-D or 3-D coordinate system. For example, locating device 48 may embody an electronic receiver configured to communicate with satellites, or a local radio or laser transmitting system used to determine a relative geographical location of itself. Locating device 48 may receive and analyze high-frequency, low-power radio or laser signals from multiple locations to triangulate a relative 3-D geographical position and orientation. In some embodiments, locating device 48 may also be configured to determine a location and/or orientation of a particular part of service vehicle 10, for example of lift arms 22 (shown only in FIG. 1). Based on the signals generated by locating device 48 and based on known kinematics of service vehicle 10, controller 44 may be able to determine in real time, the position, heading, travel speed, acceleration, and orientation of service vehicle 10 and lift arms 22. This information may then be used by controller 44, for example, to initiate the weight determination algorithm described above, and/or to attribute the information to a particular location within an electronic map or database of the environment.

It is contemplated that locating device 48 may take another form, if desired. For example, locating device 48 could be an RFID reader configured to interact with an RFID tag located within a surrounding environment (e.g., at a customer location, on receptacle 12, etc.), or another type of scanner configured to read another type of indicia (e.g., a barcode) within the environment. Based on the reading of the RFID tag or other indicia, the location and/or orientation of service vehicle 10 may be linked to the known location of the RFID tag or other indicia within the environment.

Figure 3:
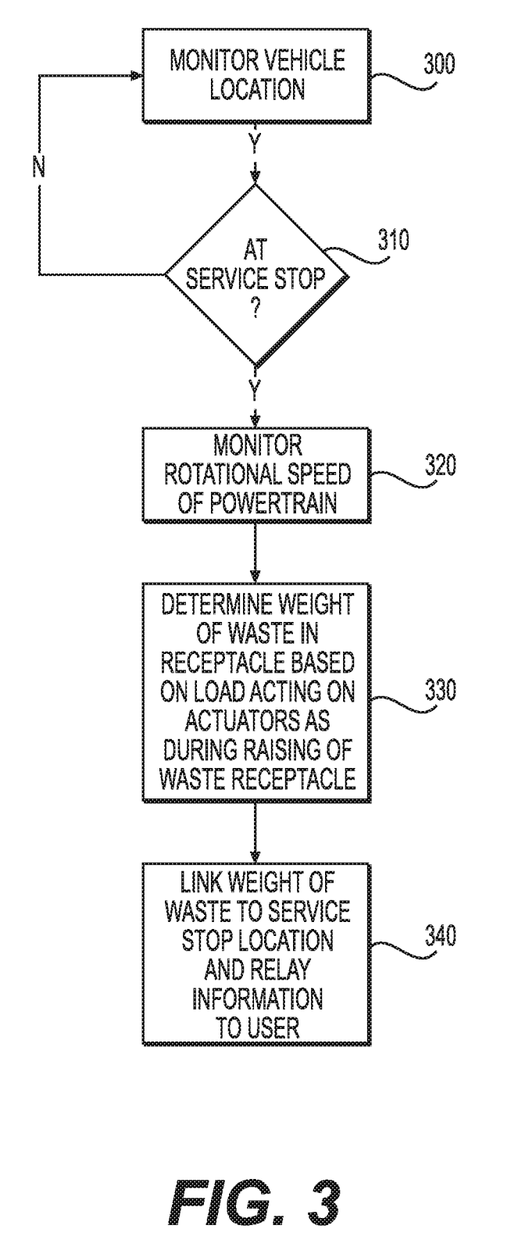
FIG. 3 is a flowchart illustrating an exemplary disclosed method of operation that may be performed by the load monitoring system of FIG. 2.

FIG. 3 illustrates a flowchart associated with an exemplary method of operating service vehicle 10 that may be performed by controller 44. FIG. 3 will be described in more detail below to further illustrate the disclosed concepts.

INDUSTRIAL APPLICABILITY

The disclosed system may be applicable to the waste service industry, where service-monitoring can affect profitability and efficiency. The disclosed system may be used to automatically monitor an amount of waste collected by a service vehicle at a particular location. Operation of the disclosed system will be described in reference to FIG. 3.

As shown in FIG. 3, operation of system 40 may begin with tracking of service vehicle location and operation (Step 300). In particular, as service vehicle 10 moves about the environment (referring to FIG. 1), the location of service vehicle 10 may be tracked via locating device 48 (referring to FIG. 2). This information may then be used by controller 44 to determine if service vehicle 10 is at or within a threshold vicinity of a known service stop (e.g., based on a listing of known service stops and associated coordinates stored in memory) (Step 310). Control may cycle through Steps 300 and 310 until controller 44 determines that service vehicle 10 is at or near a stop at which service vehicle 10 is tasked with raising and emptying receptacle 12 into bed 14.

It is contemplated that controller 44 may determine the arrival of service vehicle 10 at a service stop in another manner, if desired. For example, controller 44 may automatically determine the arrival of service vehicle 10 at a service stop based on one or more additional factors including detection by additional sensors 42, 43, and/or 45, of vibrational or acoustic frequency responses, force(s), and/or pressure(s) (e.g. air pressure in one or more of wheels 16), indicative of a service being performed by service vehicle 10. By way of another example, the operator of service vehicle 10 may provide manual input (e.g., via device 46) indicative of the arrival.

Regardless of the way in which controller 44 determines arrival at the service stop, controller 44 may activate sensor(s) 42 to monitor a rotational speed of powertrain 26 (e.g., of engine 28, transmission 30, PTO 32, torque converter 34, and/or pump 38) (Step 320). Sensor(s) 42 may responsively generate signals indicative of the rotational speed, and direct the signals to controller 44 for further processing. It is contemplated that, rather than activating sensor(s) 42 at Step 320, sensor(s) 42 may always be active and controller 44 may simply receive, record, and/or utilize the signals generated by sensor(s) 42 at Step 320.

Controller 44 may utilize the signal(s) generated by sensor(s) 42 to determine a load acting on actuators 24 during raising of receptacle 12 (e.g., a weight associated with the amount of waste inside of receptacle 12) (Step 330). As described above, controller 44 may determine the load acting on actuators 24 as a function of the rotational speed (e.g., of a speed change) of powertrain 26 during lifting and/or a time duration of the lifting. The time duration of the lifting may correspond with period of time during which the rotational speed of powertrain deviates from (e.g., is elevated above) a normal unloaded idle speed.

For example, during normal operation of service vehicle 10, when service vehicle 10 is stopped, the idle speed of powertrain 26 may be about 700 rpm. However, when actuators 24 are to be energized and cause lift arms to raise receptacle 12, PTO 32 may engage to draw power from engine 28 (e.g., via transmission 30 and/or torque converter 34). In response to the engagement of PTO 32, engine 28 may be controlled (e.g., provided with extra fuel) to increase power output, thereby raising the monitored powertrain rotational speed from 700 rpm to 1200 rpm. Engine 28 may remain at this elevated power output level as long as PTO 32 is engaged to draw power (e.g., as long as actuators 24 are raising lift arms 22 and receptacle 12). Controller 44 may monitor the change in rotational speed (e.g., from 700 rpm to 1200 rpm) and/or the time duration of the elevated rotational speed, and calculate the weight associated with the waste in the raised receptacle 12.

In an additional embodiment, upon determining the arrival of service vehicle 10 at the service stop, Step 310, controller 44 may activate sensor(s) 43 and/or 45 to monitor the acoustic and/or vibrational frequency response(s), force(s) (e.g. force on one or more lift arm(s) 22), and/or pressure(s) (e.g. air pressure in one or more of wheels 16), to monitor applicable aspects of service vehicle 10 during performance of a waste service. Sensor(s) 43, 45 may responsively generate signals indicative of frequency response(s), force(s), and/or pressure(s), and direct the signals to controller 44 for further processing. It is contemplated that, rather than activating sensor(s) 43, 45 at Step 320, sensor(s) 43, 45 may always be active and controller 44 may simply receive, record, and/or utilize the signals generated by sensor(s) 43, 45 at Step 320.

In this embodiment, controller 44 may monitor the signal(s) generated by sensor(s) 43 and/or 45 to determine the weight associated with receptacle 12 and the waste inside of receptacle 12, and/or the time duration of a waste service. For example, upon lifting a receptacle 12 to provide a waste service, the signals generated by sensor(s) 45, associated with the air pressure in wheels 16, may be expected to increase in some known proportion to the total weight of both the waste inside of receptacle 12, and the weight of receptacle 12 itself. The tire pressure may subsequently fluctuate as waste falls from receptacle 12 into bed 14. Upon completion of a service activity, when vehicle 10 no longer bears the weight of receptacle 12, controller 44 may determine the weight of waste inside of receptacle 12 by comparing signals received from sensor(s) 45 just prior to, and immediately after a waste service is performed.

In a further embodiment, controller 44 may monitor the time duration or load increase of a service activity based on signals generated by sensor(s) 43, which are configured to generate signals associated with the acoustic and/or vibrational frequency response(s) in and/or around service vehicle 12, and/or force on one or more lift arm(s) 22 during a waste service. For example, the start and finish of a waste service activity may be identified by monitoring sensor(s) 43 to identify signals indicating movement of service vehicle 10 along the Z-axis while signals from locating device 48 indicate that service vehicle 10 is not travelling. Controller 44 may utilize the signals received from sensor(s) 43, 45 to determine both the time duration of a waste service activity, the total weight of receptacle 12 and the waste inside of receptacle 12, and the total weight of waste deposited from receptacle 12 into bed 14. It is contemplated that controller 44 may monitor one or more of sensor(s) 42, 43, and 45, alone or in combination, to determine the time duration and load associated with providing a waste service.

Controller 44 may then link the weight determined at Step 330 to the service stop location (e.g., to an identity, address, and/or coordinates of the service stop location), and relay the information to the user (e.g., to the operator or a back-office manager) via one or more of output devices 46 (Step 340). For example, controller 44 may cause an indication of the weight to be displayed on output device 46, along with the location information. In another example, controller 44 may wirelessly communicate the weight and location information offboard service vehicle 10 (e.g., to a computer at a back office).

In some embodiments, controller 44 may only link the weight determined at Step 330 to the service stop location and/or relay the associated information to output device 46 when the weight exceeds a minimum threshold value. The minimum threshold value may be, for example, a fixed amount of weight (e.g., about 25 lbs) greater than a known weight of receptacle 12. This may help to inhibit recording of weight values when only an empty (or nearly empty) receptacle 12 is raised.

The disclosed system may provide a way to accurately determine the amount of waste collected at each stop made by service vehicle 10 in an inexpensive and robust manner. In particular, because the disclosed system may utilize common sensor(s) often already in use on service vehicle 10 for other purposes, the cost of the system may be low. In addition, because the sensor(s) may be located remote from where the waste is collected, the sensor(s) may be protected from impacts and contamination that could degrade the accuracy and/or longevity of system 40.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system for monitoring waste collected by a service vehicle, comprising:
   one or more processors coupled to a non-transitory memory and configured to execute instructions to perform operations comprising:
   monitoring, by a sensor, a rotational speed of a powertrain coupled to a service vehicle, the powertrain configured to power a lift actuator of the service vehicle; and
   determining a weight of waste inside a receptacle when the service vehicle is at a service stop based on the sensed rotational speed of the powertrain.

2. The system of claim 1, wherein the speed of the powertrain is remotely detected.

3. The system of claim 1, wherein the speed of the powertrain is remotely detected using an acoustic or vibrational type sensor.

4. The system of claim 1, wherein a deviation in the speed of the powertrain from a normal speed during lifting of the waste is detected; and
   the operations further comprise determining the weight of the waste lifted as a function of the deviation.

5. The system of claim 4, wherein the operations further comprise determining the weight of the waste lifted as a function of a duration of the deviation.

6. The system of claim 1, wherein determining when the service vehicle is at a service stop is based on vibrational or acoustic frequency responses.

7. The system of claim 1, wherein determining when the service vehicle is at a service stop is based on fluctuations in tire pressure.

8. A method of monitoring waste collected by a service vehicle, comprising:
   monitoring, by a sensor, a rotational speed of a powertrain coupled to a service vehicle, the powertrain configured to power a lift actuator of the service vehicle; and
   determining a weight of waste inside a receptacle when the service vehicle is at a service stop based on the sensed rotational speed of the powertrain.

9. The method of claim 8, wherein the speed of the powertrain is remotely detected.

10. The method of claim 8, wherein the speed of the powertrain is remotely detected using an acoustic or vibrational type sensor.

11. The method of claim 8, wherein a deviation in the speed of the powertrain from a normal speed during lifting of the waste is detected; and
    the method further comprises determining the weight of the waste lifted as a function of the deviation.

12. The method of claim 11, further comprising determining the weight of the waste lifted by the lift actuator as a function of a duration of the deviation.

13. The method of claim 8, wherein determining when the service vehicle is at a service stop is based on vibrational or acoustic frequency responses.

14. The method of claim 8, wherein determining when the service vehicle is at a service stop is based on fluctuations in tire pressure.

15. The method of claim 8, further comprising causing the weight of the waste to be shown on a display, along with at least one of an identification and coordinates of the service stop.

16. A non-transitory computer readable medium containing computer-executable programming instructions for performing a method for monitoring waste collected by a service vehicle, the method comprising:
   monitoring, by a sensor, a rotational speed of a powertrain coupled to a service vehicle, the powertrain configured to power one or more lift actuators of the service vehicle,
   the one or more lift actuators configured to raise lift arms of the service vehicle; and
   determining a weight of waste inside a receptacle when the service vehicle is at a service stop based on the sensed rotational speed of the powertrain.

17. The non-transitory computer readable medium of claim 16, wherein the power output of the one or more lift actuators are remotely detected.

18. The non-transitory computer readable medium of claim 16, further comprising causing the weight of the waste to be shown on a display, along with at least one of an identification and coordinates of the service stop.

19. The non-transitory computer readable medium of claim 16, wherein determining when the service vehicle is at a service stop is based on vibrational or acoustic frequency responses.

20. The non-transitory computer readable medium of claim 16, wherein determining when the service vehicle is at a service stop is based on fluctuations in tire pressure.

* * * * *